(12) United States Patent
Hart et al.

(10) Patent No.: US 10,329,439 B2
(45) Date of Patent: Jun. 25, 2019

(54) PLASTISOL COMPOSITIONS INCLUDING ORGANOSILICON COMPOUND(S)

(71) Applicant: CHOMARAT NORTH AMERICA, Anderson, SC (US)

(72) Inventors: George Hart, Ponte Vedra Beach, FL (US); Ronny Grindle, Greer, SC (US)

(73) Assignee: CHOMARAT NORTH AMERICA, Anderson, SC (US)

( * ) Notice: Subject to any disclaimer, the term of this patent is extended or adjusted under 35 U.S.C. 154(b) by 589 days.

(21) Appl. No.: 13/625,469

(22) Filed: Sep. 24, 2012

(65) Prior Publication Data

US 2014/0087612 A1    Mar. 27, 2014

(51) Int. Cl.

| | | |
|---|---|---|
| C09D 7/63 | (2018.01) | |
| C04B 20/12 | (2006.01) | |
| C04B 28/04 | (2006.01) | |
| C03C 25/1025 | (2018.01) | |
| C03C 25/28 | (2018.01) | |
| C03C 25/40 | (2006.01) | |
| C03C 25/50 | (2006.01) | |
| B32B 13/14 | (2006.01) | |
| C04B 111/00 | (2006.01) | |

(52) U.S. Cl.
CPC ............... *C09D 7/63* (2018.01); *B32B 13/14* (2013.01); *C03C 25/103* (2013.01); *C03C 25/28* (2013.01); *C03C 25/40* (2013.01); *C03C 25/50* (2013.01); *C04B 20/12* (2013.01); *C04B 28/04* (2013.01); *B32B 2262/101* (2013.01); *C04B 2111/00612* (2013.01); *Y02W 30/92* (2015.05); *Y02W 30/94* (2015.05); *Y10T 428/2962* (2015.01); *Y10T 428/2967* (2015.01); *Y10T 442/10* (2015.04)

(58) Field of Classification Search
CPC ....... B32B 13/14; C03C 25/50; C03C 25/103; C03C 25/28; C03C 25/40; C09D 7/1233; C09D 183/04; C09D 183/00; C08G 77/12–77/26; C08L 83/04; C08L 83/00
USPC ................................. 428/364–375, 380, 391
See application file for complete search history.

(56) References Cited

U.S. PATENT DOCUMENTS 3,318,757 A    5/1967  Atwell
3,460,216 A *  8/1969  Clark ...................... C03C 25/40
                                                         252/8.81

(Continued)

FOREIGN PATENT DOCUMENTS

EP         0 268 886 A3    6/1988

OTHER PUBLICATIONS

Fabric definition, Textile Glossary, Celanese Acetate, copyright 2001.*

(Continued)

*Primary Examiner* — Jennifer A Steele
(74) *Attorney, Agent, or Firm* — Alston & Bird LLP

(57) ABSTRACT

Plastisol compositions are provided including a polymeric resin in the form of particulates dispersed within a plasticizer and one or more hydrolyzable organosilicon compounds. A suitable solvent system can be utilized in the plastisol compositions. Also provided are inorganic fibers, and particularly reinforcing scrims, that are at least partially coated with a plastisol composition including one or more hydrolyzable organosilicon compounds. Cementitious boards reinforced with plastisol coated inorganic fibers, such as mesh scrims, are also provided.

42 Claims, 6 Drawing Sheets

(56) References Cited

U.S. PATENT DOCUMENTS

| | | |
|---|---|---|
| 3,998,985 A | 12/1976 | Kitaj |
| 4,203,788 A | 5/1980 | Clear |
| 4,228,061 A | 10/1980 | Plueddemann |
| 4,248,761 A * | 2/1981 | Plueddemann ............... 524/425 |
| 4,450,022 A | 5/1984 | Galer |
| 4,488,909 A | 12/1984 | Galer et al. |
| 4,504,335 A | 3/1985 | Galer |
| 4,640,864 A | 2/1987 | Porter |
| 4,916,004 A | 4/1990 | Ensminger et al. |
| 5,073,195 A | 12/1991 | Cuthbert et al. |
| 5,486,298 A * | 1/1996 | Aso ........................ D06M 7/00 106/287.1 |
| 6,054,205 A | 4/2000 | Newman et al. |
| 6,391,131 B1 | 5/2002 | Newman et al. |
| 6,579,413 B1 | 6/2003 | Grove |
| 7,235,288 B2 | 6/2007 | Kajander et al. |
| 7,803,723 B2 | 9/2010 | Herbert et al. |
| 7,875,584 B2 | 1/2011 | Miralles et al. |
| 7,892,641 B2 | 2/2011 | Puckett |
| 2005/0065275 A1 * | 3/2005 | Takahashi et al. ........... 524/588 |
| 2005/0255316 A1 * | 11/2005 | Puckett ......................... 428/375 |
| 2008/0200086 A1 | 8/2008 | Porter et al. |
| 2009/0011207 A1 | 1/2009 | Dubey |
| 2010/0151757 A1 | 6/2010 | Herbert et al. |

OTHER PUBLICATIONS

"Silanes and Siloxanes as Coupling Agents to Glass: A Perspective"; Matisons J. G. (2012); Silicone Surface Science. Advances in Silicon Science, vol. 4. Springer, Dordrecht.*

International Search Report and Written Opinion for corresponding International Application No. PCT/US2013/060031, dated Mar. 24, 2014.

Lewis, R., *Hawley's Condensed Chemical Dictionary*, 14$^{th}$ edition, John Wiley & Sons, Inc., (2001) p. 822.

Office Action for European Application No. 13 766 461.1 dated Apr. 28, 2016.

* cited by examiner

PLASTISOL COMPOSITIONS INCLUDING ORGANOSILICON COMPOUND(S)

TECHNICAL FIELD

The presently disclosed invention relates generally to plastisol compositions including one or more organosilicon compounds as well as reinforcing inorganic fibers (e.g., scrims) coated with such plastisol compositions. The coated reinforcing inorganic fibers (e.g., scrims) can be included in cementitious boards providing them with superior durability.

BACKGROUND

The mode of failure of cement boards is commonly attributed to the alkali attack of the fiberglass scrim used to reinforce the board. These scrims are coated with plasticized PVC (i.e., plastisols) and, while it is commonly accepted that plastisols provide adequate protection of the fiberglass, these coatings provide only limited protection for a period of time. Plastisols are the most commonly used coating for this market as the price and performance meet the minimum requirements established by the industry.

The cement backer board market typically utilizes PVC-coated glass scrims to provide strength and stiffness for handling and use purposes. The strength of these boards is directly affected by the durability of the scrim. Scrims produced by either a non-woven process (Chomarat North America, Chomarat, Adfors, Dewtex, Milliken, Kirson) or a woven process (Phifer Wire) typically have, within certain limits, nearly the same performance in the alkaline cement matrix. It is assumed that each manufacturer, while having their own proprietary formula, has a basic plastisol which results in similar performance in the cement board. With similar durability performance, the construction (yarns per inch in each direction) from each scrim manufacturer has to be nearly identical to provide the necessary strength, initial and aged, as specified by the cement board manufacturer and set forth by the industry standard as specified in ASTM C-947 (Standard Test Method for Flexural Properties of Thin-Section Glass-Fiber-Reinforced Concrete).

In addition, the scrim industry has typically looked toward the fiberglass yarn manufacturer to provide suitable binder chemistry (e.g., a sizing composition) on the yarn that would result in compatibility with the PVC coating and, hopefully, some degree of additional alkali resistance. The yarn manufacturer is limited to how much binder (e.g., a sizing composition) they can put on the fiberglass (typically less than 2%) which can include not only a silane for compatibility with the coating or polymer system, but a starch and lubricant package as well. Higher levels of such "add-ons" are believed to generally reduce the ability of the yarn to be subsequently processed.

Accordingly, there continues to be an industrial need for plastisol compositions exhibiting improved performance which would, preferably, also allow changes to be made in the construction of a reinforcing scrim (particularly for use in cement boards) to lower the cost and, therefore, the selling price.

BRIEF SUMMARY

One or more embodiments of the present invention may address one or more of the aforementioned problems. Certain embodiments according to the present invention provide plastisol compositions including one or more polymeric resins (e.g., homo- or copolymer) provided in the form of particulates and dispersed within a plasticizer. The plastisol compositions can beneficially comprise one or more hydrolyzable organosilicon compounds ("HOC"). As is customary, the plastisol compositions can also include a solvent system of choice. In certain embodiments, the HOC can comprise an organo-functional silane, organo-functional siloxane, organo-functional polysiloxane, or combinations thereof. Plastisols in accordance with certain embodiments of the present invention provide noticeably improved alkali aging properties.

In one aspect, embodiments of the present invention provide a fiber coated with plastisol compositions in accordance with embodiments of the present invention. In certain embodiments, an inorganic fiber can be indirectly or directly at least partially coated with a plastisol composition according to embodiments of the present invention. Preferably, the inorganic fiber comprises a glass fiber (e.g., fiberglass). In certain preferred embodiments, the inorganic fiber is completely (or at least substantially completely) coated with a plastisol composition according to embodiments of the present invention.

Additionally, embodiments of the present invention provide a scrim. Scrims in accordance with certain embodiments of the present invention can comprise a mesh of inorganic fibers. The mesh of inorganic fibers can define a plurality of cross-points (e.g., points at which one or more of the fibers overlap directly or indirectly) and a plurality of open spaces. The inorganic fibers of the scrims can comprise a solidified plastisol coating layer indirectly or directly at least partially coated onto the inorganic fibers. Preferably, the solidified plastisol coating layer comprises a plastisol composition in accordance with certain embodiments of the present invention. Beneficially, scrims according to certain embodiments of the present invention can be ideally suited for use in cementitious boards.

Accordingly, the present invention also provides a reinforced cementitious board including a matrix material comprising a cementitious material having opposed generally planar surfaces and opposed edges. The reinforced cementitious boards include at least one scrim (e.g., 1, 2, 3, etc.), according to certain embodiments of the present invention, disposed on top of at least one of the opposed generally planar surfaces or embedded within the matrix material. The embedded scrim(s) can comprise a mesh of inorganic fibers defining a plurality of cross-points and a plurality of open spaces. The inorganic fibers can include a solidified plastisol coating layer comprising a plastisol composition, in accordance with certain embodiments of the present invention, which is indirectly or directly and at least partially coated onto the inorganic fibers.

BRIEF DESCRIPTION OF THE SEVERAL VIEWS OF THE DRAWING(S)

Having thus described embodiments of the invention in general terms, reference will now be made to the accompanying drawings, which are not necessarily to scale, and wherein:

DETAILED DESCRIPTION

Figure 1:
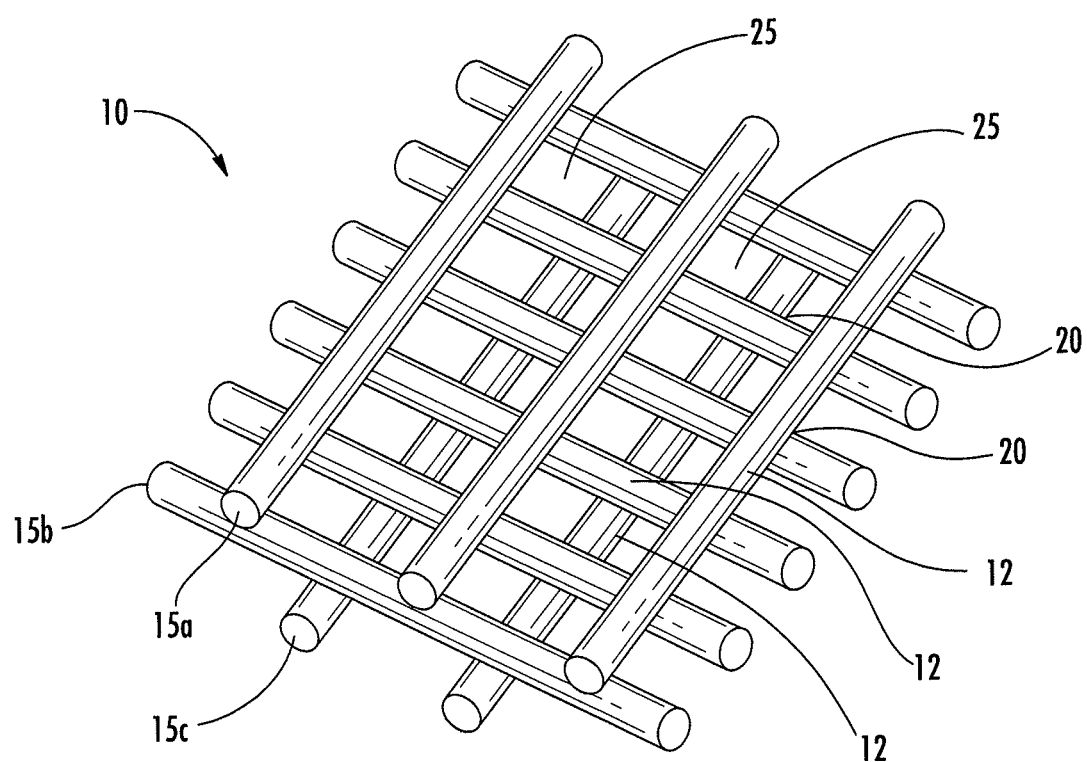
FIG. 1 illustrates a non-woven scrim having an alternating warp construction according to one embodiment of the present invention.

The present invention now will be described more fully hereinafter with reference to the accompanying drawings, in which some, but not all embodiments of the inventions are shown. Indeed, this invention can be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

In one aspect, embodiments of the present invention are directed to plastisol compositions including one or more polymeric resins (e.g., vinyl or acrylic homo- or copolymers) provided at least partially in the form of particulates and dispersed within a plasticizer. Plastisols, in general, are considered to be dispersions of usually finely divided resin in a plasticizer. Plastisols typically form a paste (the viscosity, however, can be manipulated to provide a more freely flowing material if desired) that gels when heated (e.g., 150° C.) as a result of solvation of the resin particulates by the plasticizer. The plastisol compositions according to embodiments of the present invention, however, can beneficially comprise one or more hydrolyzable organosilicon compounds ("HOC"). In certain embodiments of the present invention the one or more HOC is the only water-retarding or water-blocking plastisol additive ingredient present in the plastisol composition.

The term "organosilicon compound(s)" as used herein generally includes organic compounds including at least one carbon-silicon (C—Si) bond. In certain embodiments, "organosilicon compound(s)" can include organosilicon oxides (e.g., organosiloxanes, organopolysiloxanes, or silicones). For instance, the organosilicon compound can comprise an organo-functional silane, organo-functional siloxane, organo-functional polysiloxane, or combinations thereof. See the definition of "organosilicon" at page 822 of Hawley's Condensed Chemical Dictionary, 14$^{th}$ edition.

Organosilicon compounds according to embodiments of the present invention can generally include two different reactive groups on at least one of the silicon atoms (e.g., in scenarios in which the compound includes more than 1 Si atom) to facilitate reaction or affinity to two different materials (e.g., inorganic surfaces and organic resins via covalent bonds or via a polymeric "transition" layer between these different materials.). Generally speaking, the first reactive group can comprise a hydrolyzable moiety (e.g., an alkoxy group) bonded directly to a silicon atom. In this regard, organosilicon compounds according to the present invention are hydrolyzable. Organosilicon compounds according to certain embodiments of the present invention can include one or more hydrolyzable moieties (e.g., an alkoxy group) bonded directly to a silicon atom. Such hydrolyzable moieties, such as an alkoxy group, can undergo hydrolysis to form silanol functional groups (i.e., Si—OH) which can facilitate bonding to inorganic surfaces and self-condensation to form 2D and 3D silicone polymers. Organosilicon compounds according to embodiments of the present invention can also include an organic group attached to the silicon atom. In certain embodiments, the organic group can be reactive while in other embodiments the organic group can be non-reactive, but optionally provide varying affinities for certain functional groups. Organosilicon compounds according to certain embodiments can include one or more organic groups that can be independently tailored or selected to have any given functionality depending on the intended use of the organosilicon compound.

In certain preferred embodiments, the organosilicon compounds comprise hydrolyzable organosilicon compounds ("HOC"). In such embodiments, the HOC generally includes one or more hydrolyzable groups and at least one organic component/group that can include a desired chemical functionality (e.g., amine, epoxide, etc.). For example, the HOC can include at least one alkoxy group bonded to a Si atom, which can undergo hydrolysis, and the organic group can be tailored to include a given chemical functionality to correspond or complement a particular polymeric resin of choice (e.g., polyvinyl chloride).

Accordingly, plastisol compositions in accordance with certain embodiments of the present invention can comprise one or more HOC comprising an organo-functional silane, organo-functional siloxane, organo-functional polysiloxane, or combinations thereof. Organo-functional siloxanes can comprise compounds having silicon atoms single-bonded to oxygen in which the silicon atom also has at least one single-bond to an organic group (e.g., substituted or non-substituted hydrocarbon). Organo-functional polysiloxanes, can comprise 2D and 3D networks or readily condense into 2D and 3D networks.

Plastisol compositions in accordance with certain embodiments of the present invention can include the one or more HOC comprising amine functionality. For instance, the HOC can comprise an organo-functional silane, organo-functional siloxane, organo-functional polysiloxane, or combinations thereof, in which an organic component of the HOC includes one or more amine groups. In certain preferred embodiments, the one or more HOC comprises an amine functional polysiloxane (preferably cross-linkable) and more preferably a cross-linkable amine functional dialkylpolysiloxane. Commercially available cross-linkable amine functional dialkylpolysiloxanes are available from Wacker Chemie AG as Wacker L-756 and F-784 Silicone Fluid.

In certain embodiments, the plastisol composition can include one or more HOC comprising an alkoxy aminofunctional dialkylpolysiloxane selected from the following

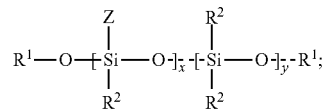

wherein $R^1$ is an alkyl group (e.g., C1-C10), such as, but not limited to, methyl; $R^2$ is a monovalent hydrocarbon group having from 1 to 20 carbon atoms or a halogen-substituted group thereof, and at least 50% of the $R^2$ groups can be methyl groups; and Z is an amino-substituted monovalent hydrocarbon group represented by the formula:

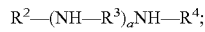

$$R^2-(NH-R^3)_a NH-R^4;$$

where $R^3$ is a divalent hydrocarbon group having from 1 to 5 carbon atoms; $R^4$ is a hydrogen atom, a monovalent hydrocarbon group having from 1 to 20 carbon atoms or a halogen-substituted group thereof; a is a number of 0, 1, 2 or 3; and x and y are each a positive integer; x+y can be varied to provide differing viscosities. In certain embodiments x+y is sufficiently large to give a viscosity from 5 to 100,000 centistokes at 25° C.

The alkoxy groups of the alkoxy aminofunctional dialkylpolysiloxane can react with water and generate terminal silanol groups (Si—OH) that when deposited onto an inorganic surface (e.g., inorganic fiber or scrim), can react with other silanol groups from a similar molecule, creating a Si—O—Si bond, causing polymerization, and creating a highly hygroscopic water-resistant polymeric coating. One example of a suitable commercially available alkoxy aminofunctional dialkylpolysiloxanes includes SF-1706, available from Momentive™, which a curable polymer containing amine functional and dimethylpolysiloxane units.

Additional amine functional HOC according to certain embodiments of the present invention include materials such as the following: Dynasylan® 1146 (an oligomeric diaminosilane-system), Dynasylan® 1122 (bis(triethoxysilylpropyl) amine), Dynasylan® SIVO 210 (combination of primary and secondary aminoalkylethoxy silanes), Dynasylan® DAMO (N-(2-aminoethyl-3-aminopropyl)trimethoxy silane), Dynasylan® SIVO 214 (aminofunctional silane composition), Dynasylan® 1505 (3-amino-propyl-methyl-diethoxysilane), and Dynasylan® DAMO-T (N-(2-aminoethyl-3-aminopropyl)trimethoxy silane) all of which are available from Evonik Industries.

In additional embodiments, the plastisol compositions can include at least one HOC including epoxide functionality. For instance, the HOC can comprise an organo-functional silane, organo-functional siloxane, organo-functional polysiloxane, or combinations thereof, in which an organic component of the HOC includes one or more epoxide groups. In certain such embodiments, the organic component of the HOC can include a residue of glycidol. In one preferred embodiment, the HOC comprises 3-glycidyloxypropyltrimethoxysilane which includes a reactive epoxide and hydrolysable inorganic methoxysilyl groups. 3-glycidyloxypropyltrimethoxysilane is commercially available as Dynasylan® Glymo from Evonik Industries.

In certain embodiments according to the present invention, the plastisol composition can include vinyl functionality. For instance, the HOC can comprise an organo-functional silane, organo-functional siloxane, organo-functional polysiloxane, or combinations thereof, in which an organic component of the HOC includes one or more vinyl groups. One example of a suitable vinyl-including HOC according to certain embodiments of the present invention includes Dynasylan® 6498 (a vinyl silane concentrate-oligomeric siloxane-containing vinyl and ethoxy groups), which is available from Evonik Industries.

Plastisol compositions in accordance with certain embodiments of the present invention can include one or more HOC having a variety of organic functionalities. As previously noted the organic component of each of the HOC can be tailored for particular end uses by incorporated a desired functionality of choice. In certain embodiments, for examples, plastisol compositions can include one or more HOC comprising at least one organic functionality (e.g., organic functional group) selected from the group consisting of amine, epoxide, vinyl, acrylate, ester, ether, acyl halide, carboxylic acid, peroxide, carbonyl, cyanate, and nitrile.

In accordance with certain embodiments, the plastisol compositions can comprise at least one HOC from at least any of the following: 0.01, 0.05, 0.1, 0.2, 0.25, 0.5, 1, 2, 3, 5, and 5 parts per hundred resin ("phr") and/or at most about any of the following: 30, 25, 20, 15, 10, 8, 7, 6, 5, 4, 3, and 2 phr (e.g., 0.01 to 20 phr, 0.1 to 5 phr, 0.25 to 5 phr, 0.25 to 2 phr). As understood by one of skill in the art, "phr" is the abbreviation for parts per hundred parts of resin. For example, as used in compositions/formulations, 1 phr means that 1 pound of an ingredient would be added to 100 pounds of resin.

In addition to including one or more HOC, the plastisol compositions can include a polymeric resin material comprising one or more polymers (e.g., PVC homopolymer or PVC copolymer). In certain embodiments, the polymeric resin material can comprise a combination of dispersion resin and blending resin. In other embodiments, the polymeric resin material can comprise all or essentially all dispersion resin. In certain preferred embodiments, the polymeric resin material comprises a vinyl polymer or polymers. Most preferably, the polymeric resin material comprises polyvinyl chloride ("PVC"). As suggested earlier, plastisol compositions are customarily based on a formula starting with a 100 phr of the resin content (e.g., PVC).

Additionally, the plastisol compositions can include one or more plasticizers. The plasticizers can be an organic compound that are added into the plastisol composition to facilitate processing and/or increase toughness to the final solidified composition by internal modification (solvation) of the polymeric resin material (e.g., PVC). Plasticizers compatible with the polymeric resin material (e.g., PVC) become an integral permanent part of the polymeric matrix. Selection of a particular plasticizer for a given polymeric resin material can be easily ascertained by one of skill in the art. In some embodiments, the plasticizer comprises non-volatile organic liquids and/or low-melting solids (e.g., phthalate, adipate, phosphates, benzoate, chlorinated paraffins, sebacate esters, etc.).

Plastisol compositions according to embodiments of the present invention can comprise one or more plasticizers from at least any of the following: 10, 20, 30, and 40 phr and/or at most about any of the following: 90, 80, 70, 65, 50, and 45 phr (e.g., 30-90 phr, 30-65 phr, 40-65 phr, etc.). In general, the particular plasticizer phr can be varied depending on the desired properties (e.g., rigidity of a fiber or scrim to be coated).

In certain embodiments according to the present invention, the plastisol compositions can include one or more stabilizers. In certain embodiments, the plastisol compositions can include from about 0.5 to about 10 phr (e.g., 1-5 phr, 1-3 phr, etc.).

Certain polymer resin materials, such as PVC, are thermally unstable. In the case of PVC, for example, heating results in elimination of HCl, the formation of a polyene sequence along the polymer chain and rapid discoloration of the mass. This autocatalytic reaction begins at about 100° C. PVC processed as a pure polymer would rapidly and completely decompose at the temperature necessary for many processing, handling, and application techniques (e.g., various coating techniques) ranging typically from 140-200° C. (for example). The addition of one or more stabilizers, therefore, can help provide protection of the polymeric resin material from the thermal decomposition. In this regard, the stabilizers can be considered to function as heat stabilizers that can retard dehydrochlorination and autooxidation. The stabilizers in certain embodiments can also scavenge evolved hydrogen chloride and block the free radicals formed during the degradation process.

Classes of stabilizers, particularly for PVC, can include complex mixtures of metal soaps with co-stabilizers, antioxidants, solvents, lubricants, etc. In certain embodiments, the mixed metals include Ba/Zn, Ca/Zn, and Ca/Al/Mg/Zn. Such "mixed metal" stabilizers can be provided in either liquid or solid form. The aforementioned stabilizers are not exhaustive of suitable stabilizers. However, selection of a suitable stabilizer, according to certain embodiments of the present invention, is within the ability of one of ordinary skill in the art.

Although not considered essential to embodiments of the present invention, it should be noted that a wider variety of additives can also be included in plastisol compositions according to certain embodiments of the present invention. A few exemplary additives, which can be added alone or in any combination, include inorganic fillers, pigments, blowing agents, and antimicrobials. Such additives can be provided in a wide variety of ranges, such as from 1-100 phr or 1-30 phr.

Plastisol compositions according to certain embodiments can also include a suitable solvent system (e.g., a single solvent or mixture of multiple solvents). In certain embodiments, the solvent system can comprise, for example, an aliphatic hydrocarbon with a flashpoint of around 120-160 F (e.g., 140 F). The solvent system generally aids in achieving a proper or desirable viscosity suitable for a given coating technique. That is, the addition of solvent can be varied to provide a plastisol composition having a predetermined viscosity based on the intended coating technology to be employed. For example, if the plastisol composition will be utilized in a single end coating the viscosity can be adjusted via addition of solvent until the plastisol viscosity is around 1000 cps (or any other desirable viscosity). Moreover, depending on the specific type and grade of resin utilized or the specific resin/plasticizer ratio, the amount of solvent could range from 1-40 phr (e.g., 1-20 phr, 5-20 phr, etc.). Additionally, depending on the type of manufacturing technology one uses to produce, for example, a plastisol coated scrim, more or less solvent can be used. For example, coated yarn produced by single end strand coating might use a plastisol with a higher viscosity than scrims produced in a non-woven fiberglass dip coating operation or a woven fiberglass dip coating operation.

In certain embodiments according to the present invention, however, the plastisol compositions are devoid of a solvent system. In such embodiments, the plastisol composition can comprise (i) one or more polymeric resins, (ii) a plasticizer, and (iii) one or more HOCs; wherein such solvent-less compositions can be provided in a liquid or paste form to which a suitable solvent system (as discussed above) can be added if so desired. That is, a suitable solvent system can optionally be added before a step of coating an object (e.g., scrim, inorganic fiber, etc.).

Methods of making plastisol compositions according to certain embodiments of the present invention can include steps of adding the respective ingredients (e.g., polymeric resin material, plasticizer, HOC) into a mixing vessel before, during, or after charging a sufficient volume of the solvent of choice. Preferably, all the plasticizer, stabilizer, HOC, and enough solvent is initially charged to the mixing vessel prior to addition of the polymeric resin material to allow for proper mixing viscosity. Each of the respective ingredients can be charged into the mixing vessel as either a liquid or a solid. Preferably, the polymeric resin material (e.g., PVC) is added under high sheer mixing in increments until all the resin has been added. The contents in the mixing vessel preferably remain under high sheer mixing until the resin is fully dispersed to provide a generally homogeneous liquid (e.g., flowable) plastisol composition. Additional solvent can be added to the liquid (e.g., flowable) plastisol composition to reach the desired viscosity. That is, addition of more solvent generally reduces the viscosity of the plastisol composition.

In another aspect, embodiments of the present invention provide a fiber coated with a plastisol compositions in accordance with embodiments of the present invention. In certain embodiments, an inorganic fiber (e.g., fiberglass filament/fibers of glass) can be indirectly or directly coated (e.g., at least partially coated, completely coated, or substantially completely coated) with a plastisol composition according to embodiments of the present invention. Preferably, the inorganic fiber comprises a glass fiber or fiberglass. In certain preferred embodiments, the inorganic fiber is completely (or at least substantially completely) coated with a plastisol composition according to embodiments of the present invention.

In certain embodiments, the coated fiber includes a plastisol composition, as disclosed herein, directly coated onto the inorganic fiber such that that plastisol composition is directly adjacent the inorganic fiber. In this regard, the plastisol coating can be considered as the initial or primary coating of the inorganic fiber. In other embodiments, however, the plastisol coating can be applied as a secondary coating (e.g., a composition applied secondarily or at some point after an initial coating of a different composition). In such embodiments, a coated fiber can include a sizing composition applied at least partially onto the inorganic fiber as an initial coating while the plastisol composition is coated onto the fiber as a secondary coating. In this regard, the sizing composition can be positioned directly adjacent at least a portion of the inorganic fiber. In certain embodiments, at least a portion of the sizing composition can be sandwiched between the inorganic fiber and the plastisol composition. The sizing composition can include one or more silanes, organosilanes, or polysiloxanes. Alternatively, however, the sizing composition can be devoid of one or more silanes, organosilanes, or polysiloxanes.

Coated fibers (e.g., inorganic fibers) in accordance with embodiments of the present invention can comprise a single strand or single filament, preferably comprising fiberglass or glass fibers. In certain embodiments, however, the inorganic fiber comprises a yarn of multiple inorganic filaments, preferably comprising fiberglass or glass fibers. In certain embodiments, the yarn of multiple inorganic filaments can comprise from 2 to 10,000 filaments (e.g., 2 to 5000, 2 to 1000, or 2 to 500 filaments).

The amount of the plastisol composition coated onto a fiber can be measured as "Loss on Ignition" (LOI), as this is the accepted industry standard. In particular, the specimen (e.g., fiber coated with a plastisol composition) is "cooked" at 600° F. for 30 minutes and the result is reported as a percentage based on EQ. 1 below. As used herein, the term "LOI" means the weight percentage of dried plastisol composition present on the fiber as determined by the following equation (EQ. 1):

$$\% LOI = [(W_i - W_a)/W_i] \times 100 \qquad \text{(EQ. 1)}$$

In EQ. 1, Wi is the initial sample weight of the coated fiber (weight of fiber plus weight of plastisol composition) prior to incineration in an oven and Wa is the weight of the fiber after incineration or "cooking".

In certain embodiment, the LOI of the coated inorganic fiber (e.g., individual filament or yarn including multiple filaments coated with a plastisol composition according to embodiments of the present invention) can comprise from at least any of the following: 20%, 25%, 30%, 35%, 40%, 45%, 50%, 55%, and 60% and/or at most about any of the following: 75%, 70%, 65%, 60%, 55%, 50%, and 45% (e.g., 25%-65%, 40-45%, 25%-45%, 25%-55%).

In certain preferred embodiments, the amount of plastisol composition coated or deposited onto the inorganic fiber (e.g., individual filament or yarn including multiple filaments coated with a plastisol composition according to embodiments of the present invention) is small enough to provide properties at least as good as conventionally coated fibers/scrims with conventional plastisol compositions, which typically have an LOI in the range of 58-62% range. In certain embodiments, for instance, a coated inorganic fiber (or scrim constructed therefrom) can exhibit the same or better properties while having an LOI that is lower (e.g., less than 50% LOI, 25-45% LOI, etc.) than the traditional values of 58-62% LOI.

Inorganic fibers (e.g., single coated strands of a single filament or yarn of multiple filaments) can be either coated in a one step or two step coating operation. In certain embodiments, an inorganic fiber can be coated with a plastisol composition, according to embodiments of the present invention, in two coating steps to ensure the integrity of the coating. For instance, a single fiber (e.g., filament or yarn) can be dip coated in a "bath" and then metered through a suitable die (e.g., a 0.012" die). The inorganic fiber can be coated at a variety of speeds depending on the particular single end strand coater utilized. In certain embodiments, the inorganic fiber can be coated from 8-16 ft/minute. Preferably, the strand (e.g., inorganic fiber) travels through an infrared heater at around 450-500° F. for 4-6 seconds to cure the plastisol coating. A second coating can then optionally be performed in a similar manner as the first application. Preferably, a slightly larger die can be used (e.g., a 0.019" die) to apply the second coating. Additional coatings can be employed if desired. For instance, if a desired LOI % is being targeted multiple coating steps can be performed. In certain embodiments, however, a single coating application provides beneficial results in amount of coating and protection of the fiber being coated. In certain embodiments, a high speed (e.g., 250-400 meters/min) single strand coater is utilized to apply the plastisol composition onto the inorganic fiber. In certain embodiments, single yarn fibers can be high speed coated to apply the plastisol composition onto the inorganic fiber. In such embodiments, these fibers travel through a cascade of plastisol with excess plastisol being metered off with one or more dies. This strand may or may not be coated again in a second or more additional coating stations as outlined. Each coating layer is fused or gelled in an oven prior to applying an additional layer of plastisol.

In certain embodiments according to the present invention, an inorganic fiber (e.g., fiberglass filament/fibers of glass) can be coated with a first plastisol composition including at least one HOC in accordance with embodiments of the present invention and subsequent coating(s) of a conventional PVC plastisol composition (e.g., devoid of an HOC). In this regard, inorganic fibers according to certain embodiments can comprise multiple coating layers of different PVC plastisol compositions, in which the first PVC plastisol coating layer comprises at least one HOC and subsequent PVC plastisol coating layers can be devoid of a HOC.

In another aspect, the present invention provides scrim. As commonly used in the cementitious board art, the term "scrim" generally means a fabric (woven or non-woven) having an open construction used as a base fabric or a reinforcing fabric. In woven scrims, the warp is the set of longitudinal or lengthwise yarns through which the weft is woven. Each individual warp thread in a fabric is called a warp end. Weft is the yarn which is drawn through the warp yarns to create a fabric. In North America, it is sometimes referred to as the "fill" or the "filling yarn". Thus, the weft yarn is lateral or transverse relative to the warp yarn. In a triaxial scrim, plural weft yarns having both an upward diagonal slope and a downward diagonal slope can be located between plural longitudinal warp yarns located on top of the weft yarns and below the weft yarns.

Scrims in accordance with certain embodiments of the present invention can comprise a mesh (e.g., an open construction) of inorganic fibers. The mesh of inorganic fibers can define a plurality of cross-points (e.g., points at which one or more of the fibers overlap directly or indirectly) and a plurality of open spaces. The inorganic fibers of the scrims can comprise a solidified plastisol coating layer indirectly or directly at least partially coated, but preferably completely or substantially completely, onto the inorganic fibers. Preferably, the solidified plastisol coating layer comprises a plastisol composition in accordance with certain embodiments of the present invention. Beneficially, scrims according to certain embodiments of the present invention can be ideally suited for use in cementitious boards.

In certain embodiments of the present invention, the scrims can comprise mesh scrims constructed from inorganic fibers that have been pre-coated with a plastisol composition (compositions according to embodiments of the present invention). Alternatively, the scrim can be constructed from inorganic fibers that are devoid of a plastisol composition. In such embodiments, the constructed scrim can be coated with a plastisol composition.

Scrims in accordance with certain embodiments of the present invention can comprise inorganic fibers having a plastisol coating layer positioned directly onto the inorganic fibers such that that plastisol coating layer is directly adjacent to the inorganic fibers (e.g., coated as an initial coating layer). Alternatively, the inorganic fibers making up the scrim can include a sizing composition positioned directly adjacent the inorganic fibers (e.g., coated as an initial coating layer) and at least partially sandwiched between the inorganic fibers and the plastisol coating layer (e.g., coated as a secondary coating). In certain embodiments, the sizing composition can include one or more silanes, organosilanes, or polysiloxanes, while in other embodiments the sizing composition is devoid of one or more silanes, organosilanes, or polysiloxanes.

In accordance with certain embodiments of the present invention, the inorganic fibers used to construct the scrims can comprise a single strand or single filament, preferably comprising fiberglass or glass fibers. In certain embodiments, however, the inorganic fibers can comprise a yarn of multiple inorganic filaments, preferably comprising fiberglass or glass fibers. In certain embodiments, the yarn of multiple inorganic filaments can comprise from 2 to 10,000 filaments (e.g., 2 to 5000, 2 to 1000, or 2 to 500 filaments). Moreover, the inorganic fibers forming the scrims (e.g., mesh scrims) according to certain embodiments of the present invention can have any of the aforementioned % LOI or ranges of % LOI disclosed above.

Scrims according to certain embodiments of the present invention can be machine constructed or hand-laid scrims. Although, the construction of a variety of particular forms of scrims is generally known in the art, hand-laid scrims, for example, can be produced by wrapping yarns pre-coated with a plastisol composition around small (e.g., 0.125") steel dowel pins along a long pin board (e.g., 24"). Next, the yarns can be wrapped around a perpendicular set of dowel pins to create a second layer of yarns. A steel plate can be heated to 350° F., for example, and then placed on top of the hand-laid scrim to melt the PVC coating. The steel plate can be allowed to cool and subsequently removed. The scrim can then be trimmed to fit as need, for example, to accommodate a cement board mold. In certain embodiments, a scrim can be produced from pre-coated single end fibers which are woven on a commercial loom into a mesh pattern and subsequently re-heated in what is called a tentering operation to re-melt the plastisol and "fix" the fibers at the crossover points. In certain embodiments, the scrim is formed prior to coating in a non-woven (layering) or woven process. For instance, yarns can be preformed into a scrim pattern using a layering technology (non-woven) and pass through a plastisol tank with the excess plastisol being metered off using a series of press rolls. Fusion or gelling can be accomplished using heated cans or utilizing any commercially viable oven technology. Additional plastisol layers may or may not be added in similar coating and heating operations. In certain embodiments, a pre-woven fiberglass scrim is coated by passing the scrim through a plastisol tank with the excess plastisol being metered off using a series of press rolls. Fusion or gelling can be accomplished using heated cans or utilizing any commercially viable oven technology. Additional plastisol layers may or may not be added in similar coating and heating operations.

Figure 2:
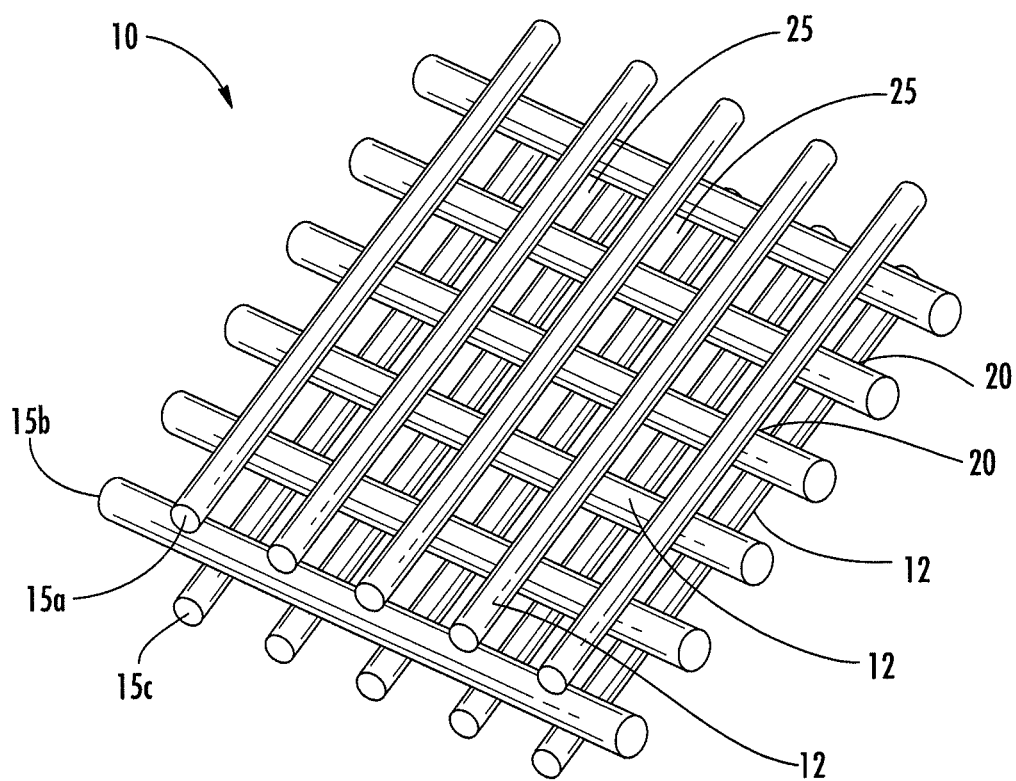
FIG. 2 illustrates a non-woven scrim having a superimposed warp construction according to one embodiment of the present invention.
Figure 3A:
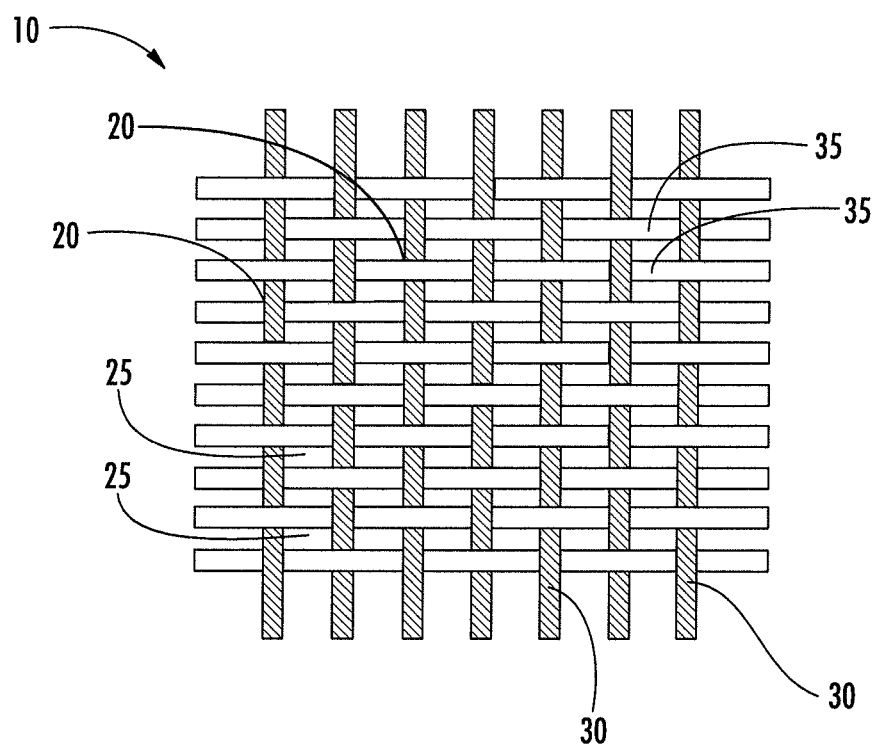
FIG. 3A illustrates a top view of a plain woven scrim according to one embodiment of the present invention.
Figure 3B:
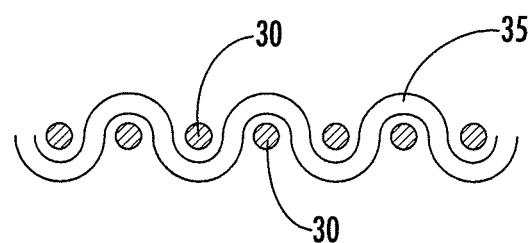
FIG. 3B illustrates a side view of the woven scrim illustrated in FIG. 3A.

As noted above, the construction of a variety of particular forms of scrims is generally known in the art. A few such examples of particular forms of non-woven scrims are illustrated in FIGS. 1 and 2. FIG. 1 shows one embodiment of a scrim 10 having an alternating warp construction including a plurality of individual yarns 12. In this particular embodiment, the scrim 10 includes three layers 15a, 15b, 15c of discrete yarns 12 forming a plurality of cross-points 20 and a plurality of open spaces 25 to form a mesh. FIG. 2 illustrates another embodiment of a scrim 10, in which the scrim 10 has a superimposed warp construction. In this particular embodiment, the scrim 10 includes three layers 15a, 15b, 15c of discrete yarns 12 forming a plurality of cross-points 20 and a plurality of open spaces 25 to form a mesh. Although FIGS. 1 and 2 show embodiments with three layers of yarns, it should be noted that scrims according to certain embodiments can have a varying number of layers (e.g., 2, 3, 3, 5, etc.). FIGS. 3A and 3B illustrate an additional scrim 10 according to certain embodiments of the present invention. FIGS. 3A and 3B illustrate a woven scrim 10 including weft yarns 30 and warp yarns 35 that are interwoven to form a mesh scrim 10 comprising a plurality of cross-points 20 and a plurality of open spaces 25. FIG. 3A provides a top view of the scrim 10 and FIG. 3B provides a side view of the scrim 10. In certain embodiments, the density of the weft and warp yarns can be varied as discussed below.

Scrims according to certain embodiments of the present invention comprise a mesh of inorganic fibers comprising from about 1-12 (e.g., 1, 2, 3, 4, 5, 6, 7, 8, 9, 10, 11, 12) yarns/cm in a transverse direction (e.g., Weft yarns) and 1-12 (e.g., 1, 2, 3, 4, 5, 6, 7, 8, 9, 10, 11, 12) yarns/cm in a longitudinal direction (e.g., Warp yarns). In certain embodiments according to the present invention, scrims can comprise a mesh of inorganic fibers comprising from about 3-5 yarns/cm in a transverse direction (e.g., Weft yarns) and 3-5 yarns/cm in a longitudinal direction (e.g., Warp yarns).

In yet another aspect, the present invention provides reinforced cementitious boards. Reinforced cementitious boards (e.g., cement boards), according to embodiments of the present invention, utilize one or more scrims (according to certain embodiments disclosed herein) as reinforcement for cementitious materials. Such reinforced cementitious boards can be used in a number of ways, including use as a backerboard for ceramic tiles, bathroom fixtures, and the like.

Reinforced cementitious boards according to certain embodiments of the present invention can include a matrix material comprising a cementitious material, preferably having opposed generally planar surfaces and opposed edges. At least one scrim (according to certain embodiments disclosed herein) can be disposed on top of at least one of the opposed generally planar surfaces or within (e.g., embedded within) the matrix material itself. At least one of the scrims in the cementitious boards comprises a mesh of plastisol coated inorganic fibers (according to certain embodiments disclosed herein) defining a plurality of cross-points and a plurality of open spaces. The inorganic fibers comprise a solidified plastisol coating layer comprising a plastisol composition according certain embodiments of the present invention. In certain embodiments, the solidified plastisol coating layer can be indirectly (e.g., applied as a secondary coating) or directly (e.g., applied as primary or initial coating) coated/located (e.g., at least partially, substantially completely, or completely coated) onto the inorganic fibers.

In certain embodiments of the present invention, the reinforced cementitious boards include a core layer of a matrix material (e.g., a cementitious material/cement composition) and plastisol coated fiberglass scrim (as disclosed herein) on the opposing surfaces of the cementitious core layer to be embedded on or slightly into the cementitious core layer. Reinforced cementitious boards, in accordance with certain embodiments of the present invention, can include a scrim (e.g., a bottom scrim) that is extended over/around at least one of the edges of the board and overlap at least a portion of the top scrim.

Various constructions of reinforced cementitious boards (e.g., cement boards) are well known in the art and the particular construction of reinforced cementitious boards (e.g., cement boards) according to certain embodiments of the present invention is not particularly limited. In certain embodiments, however, a scrim as disclosed herein is utilized as a reinforcing fabric and bonded to the surface of a core layer of a matrix material (e.g., a cementitious material) with a thin coating of cement slurry (e.g., Portland cement), with or without some fine aggregate added. Alternatively, the core mix of the matrix material can be sufficiently fluid to be vibrated or forced through the openings of the scrim (e.g., reinforcing fabric) to cover the scrim and to bond it to the core layer (e.g., matrix material of a cementitious material). Such a procedure is described in U.S. Pat. No. 4,450,022, the disclosure of which is incorporated herein by reference in its entirety.

Other methods of manufacture of cementitious boards are disclosed in U.S. Pat. No. 4,203,788, which discloses a method and apparatus for producing fabric reinforced tile backerboard panel. U.S. Pat. No. 4,504,335 discloses a modified method for producing fabric reinforced cementitious backerboard. U.S. Pat. No. 4,916,004 describes a reinforced cementitious panel in which the reinforcement wraps the edges and is embedded in the core mix of the matrix material. The disclosures of all of the above listed U.S. patents are incorporated herein by reference in their entirety.

Although the particular cementitious material utilized is not particularly limited, U.S. Publication Number 2009/0011207, incorporated herein by reference, discloses a fast setting lightweight cementitious composition for construction of cement boards or panels that can be suitable for reinforced cementitious boards according to certain embodiments of the present invention. The cementitious composition includes 35-60 wt. % cementitious reactive powder (also termed Portland cement-based binder), 2-10 wt. % expanded and chemically coated perlite filler, 20-40 wt. % water, entrained air, for example 10-50 vol. %, on a wet basis, entrained air, and optional additives such as water reducing agents, chemical set-accelerators, and chemical set-retarders. The lightweight cementitious compositions may also optionally contain 0-25 wt. % secondary fillers, for example 10-25 wt. % secondary fillers. Typical fillers include one or more of expanded clay, shale aggregate, and pumice. The cementitious reactive powder used is typically composed of either pure Portland cement or a mixture of Portland cement and a suitable pozzolanic material such as fly ash or blast furnace slag. The cementitious reactive powder may also optionally contain one or more of gypsum (land plaster) and high alumina cement (HAC) added in small dosages to influence setting and hydration characteristics of the binder. Other suitable cementitious compositions that can be suitable for certain embodiment of the present invention are described in U.S. Pat. No. 4,488,909, which discloses a cementitious composition used in a cementitious backerboard.

Figure 4:
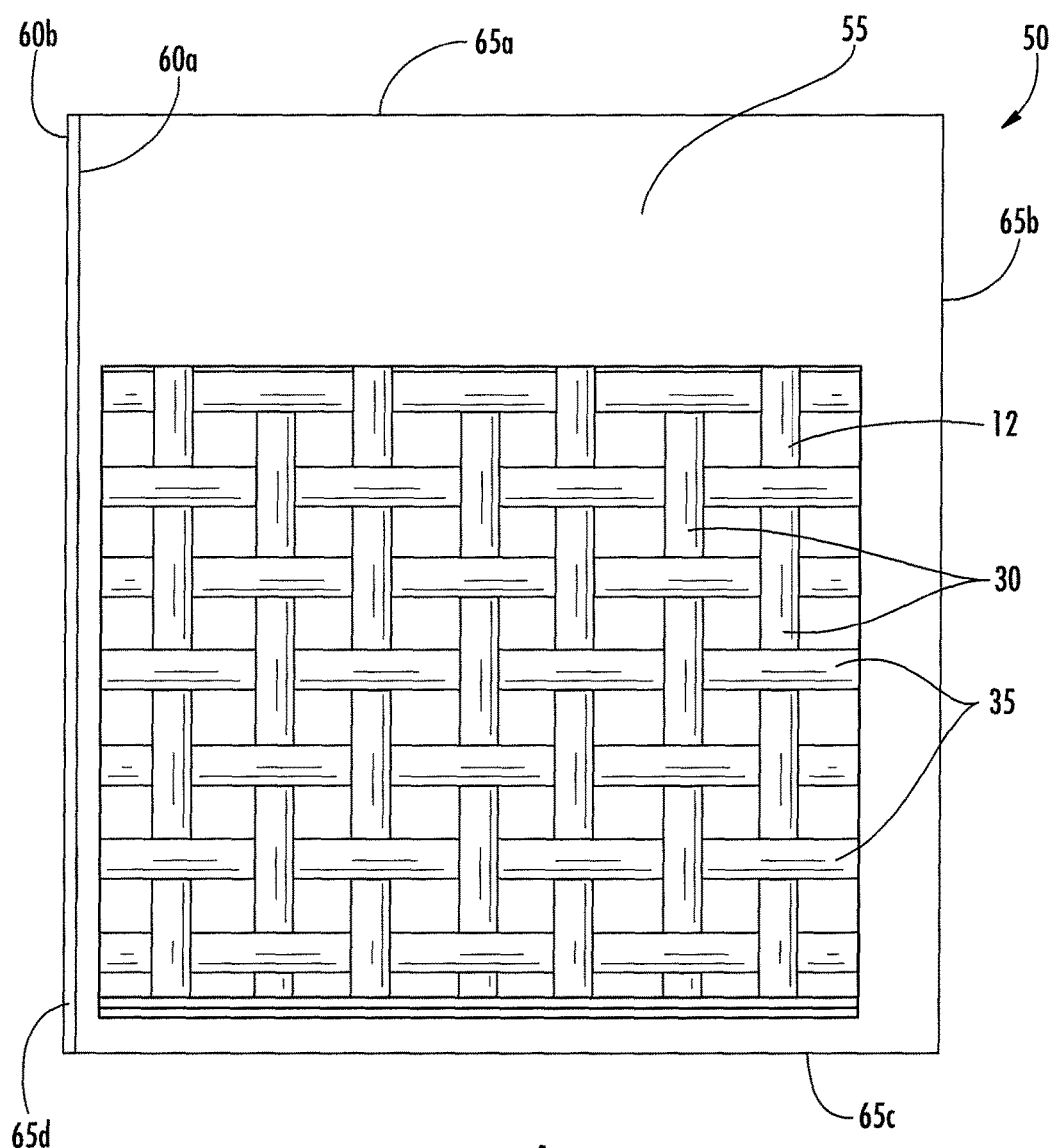
FIG. 4 illustrates a reinforced cementitious board according to one embodiment of the present invention.

FIG. 4 schematically shows a perspective view of a reinforced cementitious board 50 having a cement core 55 comprising a matrix material of a cementitious material. The core 55 of matrix material has a pair of opposed generally planar surfaces 60a, 60b and opposing edges 65a, 65b, 65c, 65d. A scrim 12 is embedded slightly within the core 12 of matrix material. That is, scrim 12 is embedded in the surface layer (e.g., a top or front surface) of the reinforced cementitious board 50 and can be wrapped about the core 55 to form a top/front scrim layer and a bottom/back layer scrim layer (not shown). In this particular embodiment, the scrim 12 has warp yarns 35 and weft 30 yarns. As referenced above, the scrim 12 can be extended around at least one opposing edge 65a, 65b, 65c, 65d and, in certain embodiments according to the present invention, overlap at least a portion of a separate backside scrim (not shown) on the opposed side of the core (preferably both being slightly or completely embedded in the cement core).

Figure 5:
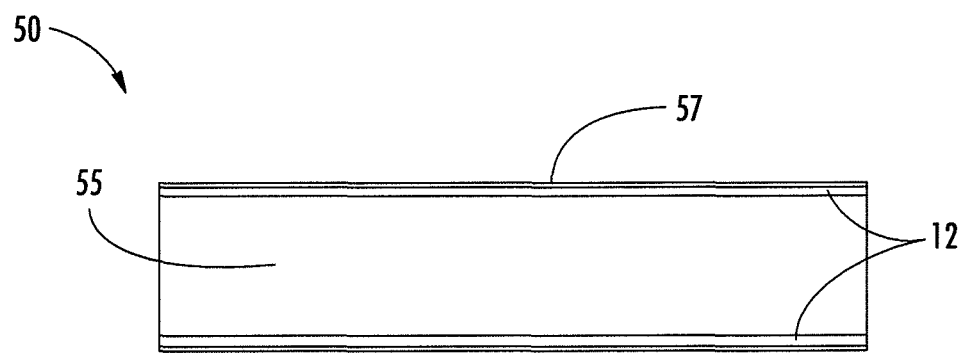
FIG. 5 illustrates a cross-sectional view of a reinforced cementitious board according to one embodiment of the present invention.

FIG. 5 schematically illustrates a cross-sectional view of a reinforced cementitious board 50 according to certain embodiments of the present invention. The particular reinforced cementitious board 50 shown in FIG. 5 shows two scrims 12 slightly embedded into a core 55 comprising a matrix material of a cementitious material. In this particular embodiment shown, each of the scrims 12 are embedded into the core 55 of matrix material such that only a slim covering layer 57 of matrix material overlies or covers all (or most) of the scrims. In certain embodiments, however, the scrims do not need to be completely embedded within the matrix material. For instance about half (e.g., 25%-75%) of the thickness of the scrims can be embedded into the core of matrix material such that that portion of the scrims not embedded within the core of matrix material is viewable by naked eye.

EXAMPLES

The present disclosure is further illustrated by the following examples, which in no way should be construed as being limiting. One skilled in the art will readily appreciate that the specific methods and results described in this section are merely illustrative, and not limiting.

I. Single-End Yarn Testing

A series of experiments were carried out to evaluate the physical properties (e.g., retention of tensile strength after an alkali soak) associated with a variety of commercially available glass yarns coated with plastisol compositions according to certain embodiments of the present invention.

In general, the single-end commercially available yarns were each dip coated in a "bath" of a PVC plastisol that included an HOC (except for "standards") and then metered through a 0.012" die. The yarns were coated at approximately 16 ft/min and then passed through an infrared heater at around 450-500° F. for 4-6 seconds to cure the plastisol coating. A second coating was then applied in a similar manner as the first application, but metered through a 0.019" die. This process was repeated as needed to achieve an LOI of 59%.

In a first series of experiments, Fulltech 172 glass fiber yarns were coated with a respective plastisol composition as described above. Fulltech 172 glass fiber yarns are commercially available from Fulltech Fiber Glass Corp. (Taiwan). An initial yarn was coated with a standard/conventional PVC plastisol composition that was devoid of a HOC. Subsequent experimental runs utilized the same PVC plastisol composition but included an HOC additive according to certain embodiments of the present invention. The amount of HOC in each plastisol composition was 2 phr.

Each of the coated yarns was tested for initial tensile strength utilizing the following equipment: MTS Alliance RT/50 Tensile Tester (annually calibrated by MTS onsite); MTS 2000 N Advantage Pneumatic Grips; MTS load cell (annually calibrated by MTS onsite); 1 inch tall by 3 inch wide smooth flat rubber faces for MTS Grips; and a Salvis Lab Thermocenter Type TC-40 oven. More specifically, approximately 20-30 pieces of about 6 inch sections of the yarns were cut to provide multiple test samples. The 2 kN pneumatic jaws were examined for correct installation, 1 inch tall by 3 inch wide faces for rubber wear, and general appearance of machine for wear or set-up anomalies. Proper load cell was confirmed or installed if necessary. Proper gripping was confirmed or installed if necessary. Using the machine controls (jog buttons) and a steel ruler, the grips were spaced to approximately 2⅞ inches apart. A single-end yarn sample was placed in the center of the grip making sure it was not loose and that it was straight. Once in the sample was in position, the faces were closed with the pneumatic foot lever. The cross head speed for this test was 1.97 inch/minute. The MTS pneumatic grips were set to a grip pressure of a minimum of 60 psi. The tensile strength for each respective yarn was tested 20 times to provide the initial tensile strength of each respective yarn.

After obtaining an initial tensile strength measurement for each yarn, a simulation of ageing of the single-end coated yarns was conducted to determine the respective loss of strength associated with each yarn. To begin, a lime solution was prepared by adding 891 g of distilled water was added to a 1 L sealable vessel (i.e., a jar). 9 g of calcium hydroxide was then added to the water (solution=1% Ca(OH)$_2$ pH=13.2). The vessel was sealed with a lid and mixed by shaking for 10 seconds. The alkalinity of the solution was confirmed by a digital pH meter. The sealed containers were placed in oven at 90 C or 194 F for at least 2 hours. The sealed containers were removed from the oven, opened, and allowed to cool for 30 minutes (max). The solution temperature was not allowed to drop below 60 C or 140 F. A tongue depressor wrapped with a yarn sample was placed into jar and the lid was screwed on tightly (each jar only contained one yarn sample). The jars, now including a test sample, were placed back in the oven for 24 hours (90 C or 194 F). After the 24 hours in the oven, the jars were removed and allowed to stand for 30 minutes. The samples were removed using large tweezers and placed on paper towel for 24 hour drying. After the 24 hour drying period, the yarn samples were retested for tensile strength (e.g., "after soak" tensile strength) in the same manner as they were tested for the initial tensile strength.

The % tensile strength retention for each yarn was calculated from the initial tensile strength and the "after soak" tensile strength. The results of this series of experiments are summarized in Table 1 below.

TABLE 1

Tensile Strength Retention Data for Various HOC additives. All conditions produced with Fulltech 172 glass fiber with two-step coating (0.012"/0.019" dies) to reach 59% nominal LOI.

| Run Number | HOC Additive Type at 2 PHR | Tensile Strength Retention (%) |
|---|---|---|
| Standard | PVC plastisol with no HOC | 74.1 |
| 1 | Evonik Dynasylan ® 6498 | 91.1 |
| 2 | Evonik Dynasylan ® 1146 | 92.5 |
| 3 | Evonik Dynasylan ® Glymo | 91.9 |
| 4 | Evonik Dynasylan ® 1122 | 88.8 |
| 5 | Evonik Dynasylan ® SIVO 210 | 82.0 |
| 6 | Evonik Dynasylan ® DAMO | 87.2 |
| 7 | Evonik Dynasylan ® SIVO 214 | 91.0 |
| 8 | Evonik Dynasylan ® 1505 | 80.0 |
| 9 | Evonik Dynasylan ® DAMO-T | 82.8 |
| 10 | Wacker F-784 | 98.8 |
| 11 | Wacker F-756 | 100.0 |

As shown in Table 1, a significant improvement was realized by yarns coated with HOC according to certain embodiments of the present invention in comparison to yarns coated with the traditional (devoid of an HOC) plastisol composition.

A second series of experiments was performed to evaluate the performance of 6 different commercially available glass fiber yarns coated with a plastisol composition according to one embodiment of the present invention. For each yarn, a "standard" was run in which the yarn was coated with a traditional PVC plastisol (devoid of an HOC). Each yarn was also coated with a plastisol composition according to one embodiment of the present invention. As shown in Table 2, some of the yarns tested included a sizing composition generally including silane(s) while a few did not. The tensile strength retention percentage was evaluated in the same manner as described above. The results are summarized in Table 2 below.

TABLE 2

Effect of HOC additive (i.e., Wacker F-756) on Various Glass Yarns. All conditions produced with two-step coating (0.012"/0.019" dies) to reach 59% nominal LOI. Wacker F-756 additive was used in each run. AGY 723 and AGY 620 glass fiber yarns are commercially available from AGY (Aiken SC, USA). PPG 695 glass fiber yarns are commercially available from PPG Industries (USA). Vetrotex T6M and T30M glass fiber yarns are commercially available from Saint-Gobain Vetrotex America (Huntersville NC, USA).

| Yarn Type | HOC Additive Amount | Silane in Binder/ Sizing Composition (Y/N) | Tensile Strength Retention (%) |
|---|---|---|---|
| AGY 723 | 0 phr | Y | 68.9 |
| AGY 723 | 2 phr | Y | 93.8 |
| AGY 620 | 0 phr | N | 46.2 |
| AGY 620 | 2 phr | N | 97.6 |
| PPG 695 | 0 phr | Y | 82.4 |
| PPG 695 | 2 phr | Y | 94.4 |
| Fulltech 172 | 0 phr | Y | 74.1 |
| Fulltech 172 | 2 phr | Y | 100.0 |
| Vetrotex T6M | 0 phr | Y | 69.6 |
| Vetrotex T6M | 2 phr | Y | 100.0 |
| Vetrotex T30M | 0 phr | N | 42.3 |
| Vetrotex T30M | 2 phr | N | 100.0 |

As can be seen in Table 2, the tensile strength retention % of all commercially available yarns tested showed a significant improvement. Furthermore, all yarns showed a significant improvement regardless of whether the sizing composition of the yarn included a sizing composition having a silane(s).

A third series of experiments was performed to evaluate the impact of varying the HOC phr in the plastisol compositions. Fulltech 172 yarn was used in each experimental run. Again, a standard (plastisol with no HOC) was performed to provide a basis for comparison. The HOC phr was incrementally increased for each run and the tensile strength retention % for each yarn was determined in the same manner as previously discussed. The results are summarized in Table 3 below

TABLE 3

Effect of varying PHR of HOC additive (i.e., Wacker F-756). All conditions produced with two-step coating (0.012"/0.019" dies) to reach 59% nominal LOI. Fulltech 172 yarns were used in each of these runs. Wacker F-756 additive was used in each run.

| Run Number | Additive Amount (phr) | Tensile Strength Retention (%) |
|---|---|---|
| Standard | 0.0 | 74.1 |
| 1 | 0.25 | 89.2 |
| 2 | 0.50 | 92.0 |
| 3 | 0.75 | 86.2 |
| 4 | 1.0 | 97.1 |
| 5 | 2.0 | 100.0 |
| 6 | 4.0 | 98.2 |
| 7 | 6.0 | 92.4 |

As shown in Table 3, a significant improvement was realized at only 0.25 phr in comparison to the standard.

A fourth series of experiments was performed to analyze the impact of the coating amount applied to yarns (e.g., see the "standard" in Table 1). Fulltech 172 yarn and Wacker F-756 additive (at 2 phr) was used in each experimental run. The LOI % was varied across multiple experimental runs and the tensile strength retention % for each yarn was determined in the same manner as previously discussed. The results are summarized in Table 4 below.

TABLE 4

Effect of Coating Amounts of PVC plastisol modified with a HOC. All conditions produced with Fulltech 172 yarn. Wacker F-756 additive was used in each run.

| Die Size (inches) | Approximate LOI (%) | Tensile Strength Retention (%) |
|---|---|---|
| 0.010 (single step) | 25 | 75.6 |
| 0.011 (single step) | 34 | 77.9 |
| 0.012 (single step) | 41 | 92.9 |
| 0.013 (single step) | 49 | 88.6 |
| 0.014 (single step) | 53 | 91.2 |
| 0.015 (single step) | 57 | 93.9 |
| 0.017 (single step) | 63 | 98.0 |
| 0.012 + 0.019 (two step) | 59 | 100.0 |

At over 25% LOI, as shown in Table 4, achievement of better or at least the same tensile strength retention % was realized in comparison to the same yarn coated with the standard plastisol composition. These results are surprising considering that the only difference between the standard plastisol composition and the "modified" plastisol compositions in all four sets of experiments is the addition of a minor amount of an HOC.

Figure 6:
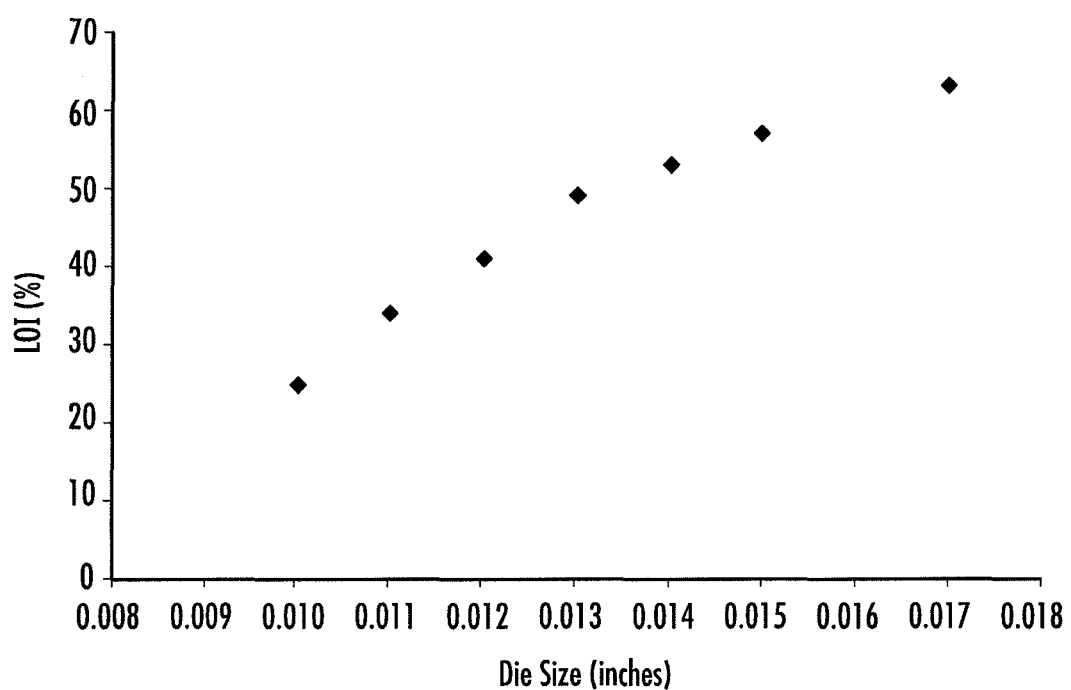
FIG. 6 is a graph plotting the LOI % as a function of the die size according to certain embodiments of the present invention.

FIG. 6 provides a graph plotting the LOI % as a function of the die size. As shown in FIG. 6, the LOI % increases steadily as the die size is increased.

Figure 7:
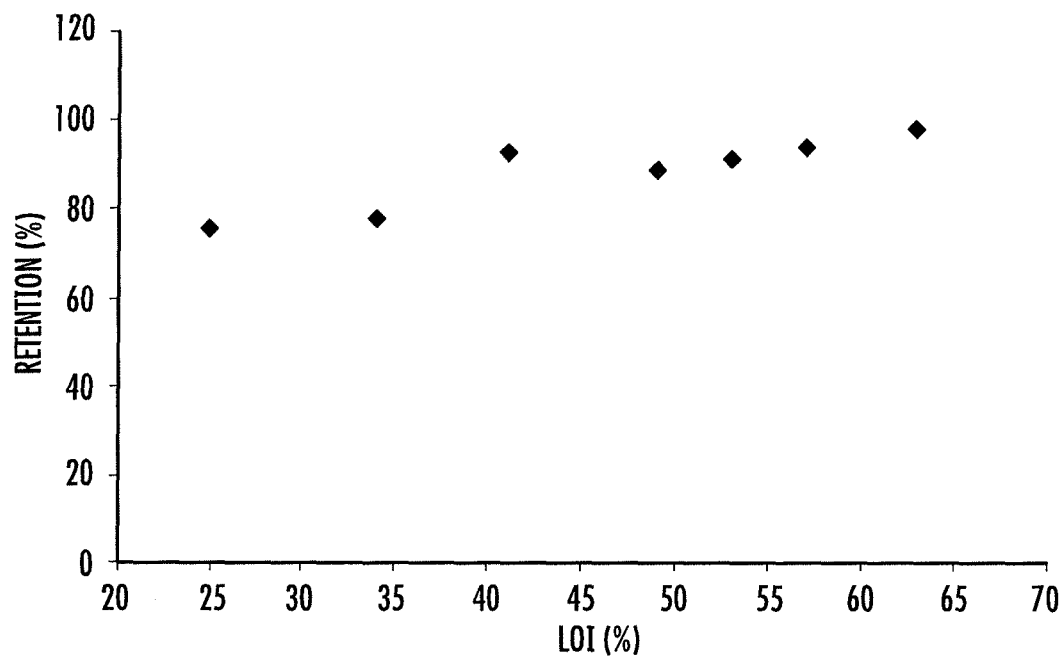
FIG. 7 is a graph plotting the tensile strength retention % versus the LOI % according to certain embodiments of the present invention.

FIG. 7 provides a graph plotting the tensile strength retention % vs. the LOI %. As shown in FIG. 7, the tensile strength retention % only gradually increases with increased LOI %.

II. Modulus of Rupture for Cementitious Boards

A series of experiments were conducted to evaluate the flexural strength retention of cementitious boards according to certain embodiments of the present invention. As referenced in Table 5 below, most of the cementitious boards were assembled using a machine made scrim while one cementitious board was assembled using a hand-laid scrim. The machine-made scrims were constructed of 10.16 warp ends per inch and 8.0 weft yarns per inch. The warp ends were placed in an alternating pattern in relation to the weft yarn position. Similarly, the hand-laid scrim was produced by laying the warp yarns in an alternating pattern at 8.0 yarns per inch with weft yarns spaced also at 8.0 per inch. The hand-laid scrim was constructed from yarns pre-coated with a plastisol composition according to certain embodiments of the present invention. In particular, that hand-laid scrim was constructed by wrapping yarns pre-coated with a plastisol composition around small (i.e., 0.125") steel dowel pins along a long pin board (i.e., 24"). Next, the yarns were wrapped around a perpendicular set of dowel pins to create a second layer of yarns. A steel plate was heated to 350° F. and then placed on top of the hand-laid scrim to melt the PVC coating. The steel plate was allowed to cool and subsequently removed to provide a hand-laid scrim for use in a cementitious board.

Each of the reinforced cementitious boards was hand-made in a jig according to the following procedure. A piece of scrim was cut to fit inside a mold (approximately 12"× 36"×½" deep). A cementitious slurry was made including (i) 2,400 grams aggregate of ⅜ inch fine or less, (ii) 2,000 grams cement, (iii) 700 grams water, and (iv) 3 drops of dishwashing detergent. The cementitious slurry was poured into mold and spread evenly across. The mechanical mold (having the bottom scrim and slurry therein) was vibrated for 5 minutes on a vibrating table. The thickness of the slurry was then leveled to about ½ inch. A second piece of scrim was placed on top of the wet slurry, and a small towel was used to smooth the cement and, thereby, place the scrim just below the surface of the slurry. The contents were allowed to cure at room temperature (70 F) for 7 days.

Figure 8:
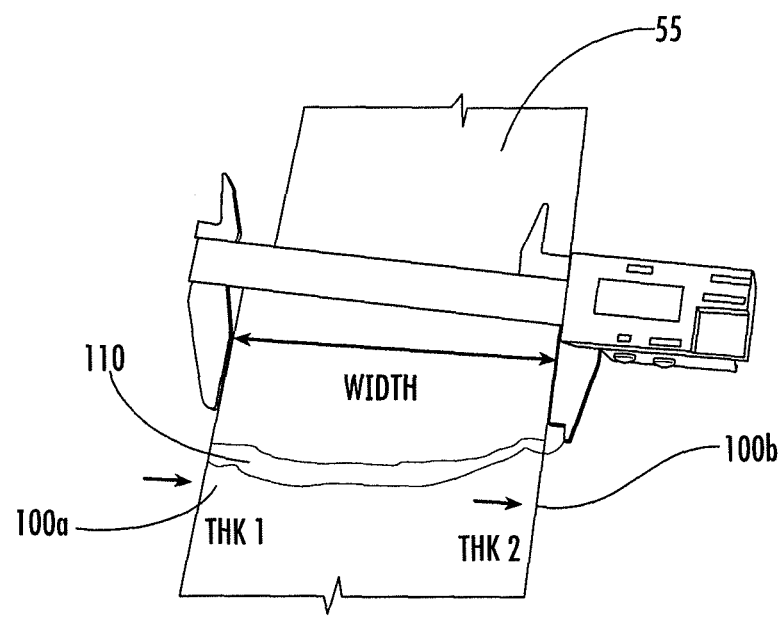
FIG. 8 shows measurement locations of a broken cementitious board.

After the 7 day cure, the reinforced cementitious boards were removed from the jig and each board was cut into 4" wide specimens (i.e., 4" wide and 12" long–Warp—to provide 9 separate specimens). Four of the 4" cut specimens are immediately inserted into an Instron machine equipped with a four-point testing jig for measuring the maximum load at break. The board thickness was measured with calipers at the two positions 100a, 100b, near the break 110 as shown in FIG. 8 to provide initial measurements for each board.

An additional set of four specimens (4" cut specimens not used in initial test), were placed in an 80 C water bath and allowed to soak for 14 days. After soaking, the specimens were removed from the water bath and air dried for 1 hour followed by testing in the Instron machine for measuring the maximum load at break of the soaked boards. After breaking, the board thickness was measured at two positions near the break in the same fashion as performed for the non-soaked specimens discussed above.

The values obtained from the measurements of the non-soaked boards and the soaked boards were used to calculate the data provided in Table 5 below.

TABLE 5

Flexural Strength Retention (14-day) of cement boards. All scrims were constructed from Fultech 172 glass fiber. The "standard" used a convention PVC plastisol (devoid of a HOC).

| Condition | Scrim Construction (number/inch) | Initial MOR (psi) | 14-day soak MOR (psi) | Flexural Strength Retention (%) |
|---|---|---|---|---|
| Fulltech + conventional PVC plastisol (Standard) | | | | |
| Warp Direction | 10.2 | 1110 | 774 | 69 |
| Fill Direction | 8.0 | 1127 | 796 | 72 |
| Fulltech + 2 phr F-756 (lab) | | | | |
| Warp Direction | 8.0 | 1030 | 957 | 93 |
| Fulltech + 1 phr F-756 | | | | |
| Warp Direction | 10.2 | 936 | 1085 | 104 |
| Fill Direction | 8.0 | 977 | 903 | 83 |
| Fulltech + 2 phr F-756 | | | | |
| Warp Direction | 10.2 | 1105 | 1063 | 96 |
| Fill Direction | 8.0 | 1164 | 1057 | 91 |

As shown in Table 5, the reinforced cementitious boards according to certain embodiments of the present invention (i.e., HOC modified plastisol coating on the scrim) exhibited a dramatic improvement in flexural strength retention in comparison to the board made with a scrim coated with a conventions PVC plastisol composition (devoid of a HOC).

Many modifications and other embodiments of the invention set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific teens are employed herein, they are used in a generic and descriptive sense only and not for purposes of limitation.

That which is claimed:

1. A coated fiber, comprising: an inorganic fiber indirectly or directly at least partially coated with a plastisol composition, said plastisol composition comprising (i) a plasticizer; (ii) a polymeric resin; and (iii) one or more hydrolyzable organosilicon compounds ("HOC"), wherein the one or more hydrolysable organosilicon compounds comprise a crosslinked amine functional dialkylpolysiloxane.

2. The fiber according to claim 1, wherein the inorganic fiber is substantially completely coated with the plastisol composition.

3. The fiber according to claim 1, wherein the plastisol composition is directly coated onto the inorganic fiber such that that plastisol composition is directly adjacent the inorganic fiber.

4. The fiber according to claim 1, further comprising a sizing composition positioned directly adjacent the inorganic fiber and sandwiched between the inorganic fiber and the plastisol composition.

5. The fiber according to claim 4, wherein the sizing composition includes one or more silanes, organosilanes, or polysiloxanes.

6. The fiber according to claim 4, wherein the sizing composition is devoid of one or more silanes, organosilanes, or polysiloxanes.

7. The fiber according to claim 1, wherein the inorganic fiber is a single strand.

8. The fiber according to claim 1, wherein the inorganic fiber comprises a yarn of multiple inorganic filaments.

9. The fiber according to claim 8, wherein the inorganic filaments comprise fiberglass.

10. The fiber according to claim 1, wherein the inorganic fiber comprises fiberglass.

11. A scrim, comprising: a mesh of coated fibers according to claim 1, the fibers defining a plurality of cross-points and a plurality of open spaces.

12. The scrim according to claim 11, wherein the inorganic fibers are substantially completely coated with the plastisol coating layer.

13. The scrim according to claim 11, wherein the plastisol coating layer is positioned directly onto the inorganic fibers such that that plastisol coating layer is directly adjacent the inorganic fibers.

14. The scrim according to claim 11, wherein the inorganic fibers further comprise a sizing composition positioned directly adjacent the inorganic fibers and sandwiched between the inorganic fibers and the plastisol coating layer.

15. The scrim according to claim 14, wherein the sizing composition includes one or more silanes, organosilanes, or polysiloxanes.

16. The scrim according to claim 14, wherein the sizing composition is devoid of one or more silanes, organosilanes, or polysiloxanes.

17. The scrim according to claim 11, wherein the inorganic fibers comprise individual single strands.

18. The scrim according to claim 11, wherein the inorganic fibers comprise yarn of multiple inorganic filaments.

19. The scrim according to claim 18, wherein the inorganic filaments comprise fiberglass.

20. The scrim according to claim 11, wherein the inorganic fibers comprises fiberglass.

21. A reinforced cementitious board, comprising:
(i) a matrix material comprising a cementitious material having opposed generally planar surfaces and opposed edges; and
(ii) at least one scrim disposed on top of at least one of the opposed generally planar surfaces or within the matrix material, said scrim comprising a mesh of coated fibers according to claim 1, the fibers defining a plurality of cross-points and a plurality of open spaces.

22. The reinforced cementitious board according to claim 21, wherein the inorganic fibers are substantially completely coated with the plastisol coating layer.

23. The reinforced cementitious board according to claim 21, wherein the plastisol coating layer is positioned directly onto the inorganic fibers such that that plastisol coating layer is directly adjacent the inorganic fibers.

24. The reinforced cementitious board according to claim 21, wherein the inorganic fibers further comprise a sizing composition positioned directly adjacent the inorganic fibers and sandwiched between the inorganic fibers and the plastisol coating layer.

25. The reinforced cementitious board according to claim 24, wherein the sizing composition includes one or more silanes, organosilanes, or polysiloxanes.

26. The reinforced cementitious board according to claim 24, wherein the sizing composition is devoid of one or more silanes, organosilanes, or polysiloxanes.

27. The reinforced cementitious board according to claim 21, wherein the inorganic fibers comprise individual single strands.

28. The reinforced cementitious board according to claim 21, wherein the inorganic fibers comprise yarn of multiple inorganic filaments.

29. The reinforced cementitious board according to claim 21, wherein the inorganic filaments comprise fiberglass.

30. The reinforced cementitious board according to claim 21, wherein the inorganic fibers comprises fiberglass.

31. The fiber according to claim 1, wherein the HOC further comprises an organo-functional silane.

32. The fiber according to claim 1, wherein the HOC further comprises one or more organo-functional siloxane, organo-functional polysiloxane, or combinations thereof with an epoxide functionality.

33. The fiber according to claim 1, wherein the HOC further comprises one or more organo-functional siloxane, organo-functional polysiloxane, or combinations thereof with at least one functionality selected from the group consisting of amine, epoxide, vinyl, acrylate, ester, ether, acyl halide, carboxylic acid, peroxide, carbonyl, cyanate, and nitrile.

34. The fiber according to claim 32, wherein the HOC comprises a residue of glycidol.

35. The fiber according to claim 34, wherein the HOC comprises 3-glycidyloxypropyltrimethoxysilane.

36. The fiber according to claim 1, wherein the one or more HOC includes at least one alkoxy group bonded to a Si atom.

37. A coated fiber, comprising: an inorganic fiber indirectly or directly at least partially coated with a plastisol composition, said plastisol composition comprising (i) a plasticizer; (ii) a polymeric resin; and (iii) one or more hydrolyzable organosilicon compounds ("HOC"), wherein the one or more hydrolysable organosilicon compounds comprise a cross-linkableamine functional dialkylpolysiloxane, wherein the one or more HOC comprises an alkoxy aminofunctional dialkylpolysiloxane selected from the following:

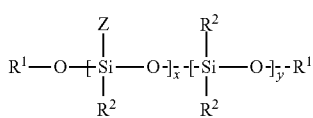

wherein R1 is an alkyl group; R2 is a monovalent hydrocarbon group having from 1 to 20 carbon atoms or a halogen-substituted group thereof; and Z is an amino-substituted monovalent hydrocarbon group represented by the formula:

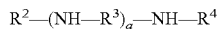

wherein R3 is a divalent hydrocarbon group having from 1 to 5 carbon atoms; R4 is a hydrogen atom, a monovalent hydrocarbon group having from 1 to 20 carbon atoms, or a halogen-substituted group thereof; a has a value of 0, 1, 2 or 3; and x and y are each positive integers.

38. The fiber according to claim 1, wherein the polymeric resin comprises polyvinyl chloride ("PVC").

39. The fiber according to claim 1, wherein the composition comprises from 0.01 to 20.0 parts per hundred resin ("phr") of said one or more HOC.

40. The fiber according to claim 39, wherein the composition comprises from 0.25 to 5.0 phr of said one or more HOC.

41. The fiber according to claim 1, wherein the composition further comprises a stabilizer, a solvent system, or combination thereof.

42. The fiber according to claim 1, wherein the composition further comprises one or more additives selected from inorganic fillers, pigments, blowing agents, and antimicrobials.

* * * * *